M. LOUNSBURY.
Fruit-Gatherer.

No. {2,839, 33,843.}

Patented Dec. 3, 1861.

UNITED STATES PATENT OFFICE.

MARK LOUNSBURY, OF SEYMOUR, CONNECTICUT.

IMPROVEMENT IN FRUIT-GATHERERS.

Specification forming part of Letters Patent No. 33,843, dated December 3, 1861.

*To all whom it may concern:*

Be it known that I, MARK LOUNSBURY, of Seymour, in the county of New Haven and State of Connecticut, have invented, made, and applied to use a certain new and useful Improvement in Fruit-Gatherers; and I do hereby declare that the following is a full, clear, and exact description of my said invention, reference being had to the annexed drawings, making part of this specification, wherein—

Figure 1:
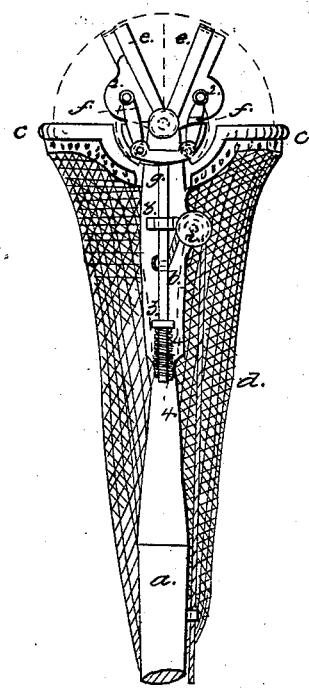
Figure 2:
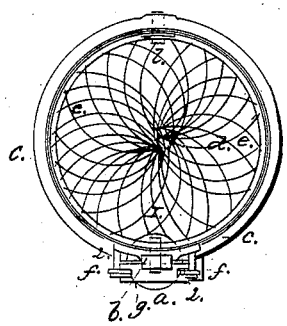

Figure 1 is an elevation of my said gatherer, and Fig. 2 is a plan of the same.

Similar marks of reference denote the same parts.

My invention, as distinguished from the fruit-gatherers heretofore constructed, consists in a slide actuated by a cord and connected by links to two knives of a semicircular shape, so that said knives are brought together by the said slide and separate the apples, pears, or other fruit by cutting the stem, and the fruit itself falls in a basket or bag depending from a ring on the end of a handle or pole carrying said fruit-gatherer.

In the drawings, $a$ is the handle or pole of my gatherer. $b$ is a socket and bar at the end of said pole, and $c$ is a ring on said bar carrying the bag or basket $d$ that receives the fruit.

$e\ e$ are semicircular or polygonal knives set and moving on the center pins, 1 1, and provided with projecting arms 2 2, taking the links $f\ f$ that connect with the slide-bar $g$ that is sustained in the slides 3 3.

$h$ is a cord or string over the roller $i$, connected with the slide-bar $g$, so that upon pulling down said cord $h$ the slide-bar $g$ will be forced up, and the links $f\ f$ will throw up the knives $e\ e$ until their edges come in contact for the separation of the stem of any fruit to which the gatherer may be applied, and said fruit falls into the bag $d$.

A spring, 4, may be employed to commence the opening of the knives $e\ e$ after they have been closed, as aforesaid; but this spring may not always be required, as the knives will fall back and open of their own weight, aided by the weight of the slide-bar, unless the knives should pass into and bind upon each other.

When not in use the knives $e\ e$ lie close to the ring $c$, out of the way. My gatherer is cheap and durable, and sufficiently strong to cut off the stem of any fruit that the apparatus may be adapted to receive, and the entire force expended in cutting off said stem is applied to the apparatus itself without giving motion to the tree or limb, that with many other fruit-gathers is found practically to be of great detriment in consequence of shaking off other fruit.

What I claim, and desire to secure by Letters Patent, is—

The slide-bar $g$ and links $f\ f$, actuated by the cords $h$, in combination with the knives $e\ e$ and receptacle or bag $d$, for the purposes and as set forth.

In witness whereof I have hereunto set my signature this 12th day of October, 1861.

MARK LOUNSBURY.

Witnesses:
JOHN F. GRAY,
THOS. GEO. HAROLD.